United States Patent [19]

Monti et al.

[11] Patent Number: 5,506,734
[45] Date of Patent: Apr. 9, 1996

[54] DRIVE CIRCUIT FOR A MAGNETIC CASSETTE READER WITH AUTO REVERSE AND MUTE FUNCTIONS

[75] Inventors: Marco M. Monti, Milan; Andrea Onetti, Pavia; Domenico Rossi, Cilavegna, all of Italy

[73] Assignee: SGS-Thomson Microelectronics, S.r.l., Agrate Brianza, Italy

[21] Appl. No.: 99,611

[22] Filed: Jul. 30, 1993

[30] Foreign Application Priority Data

Jul. 30, 1992 [EP] European Pat. Off. ............. 92830430

[51] Int. Cl.⁶ .............................. G11B 5/09; G11B 15/12
[52] U.S. Cl. ................................ 360/46; 360/61; 360/63
[58] Field of Search .......................... 360/46, 61, 63, 360/67, 74.4; 357/41; 330/253, 269, 277

[56] References Cited

U.S. PATENT DOCUMENTS

| | | | |
|---|---|---|---|
| 3,721,774 | 3/1973 | Yonemoto et al. | 179/100.1 |
| 4,847,706 | 7/1989 | Jun | 360/61 |
| 5,144,502 | 9/1992 | Somers | 360/63 |

FOREIGN PATENT DOCUMENTS

| | | |
|---|---|---|
| 0490295 | 6/1992 | European Pat. Off. . |
| 2808707 | 9/1979 | Germany . |
| 2829463 | 1/1980 | Germany . |
| 2113032 | 7/1983 | United Kingdom . |

OTHER PUBLICATIONS

Microelectronics, 2nd Ed., 1987, McGraw–Hill Book Company, Millman et al., pp. 148–149.
Patent Abstracts of Japan, vol. 16, No. 33 (P01389) Jul. 20, 1992 & JP-A-4098687 (Hitachi Ltd) Mar. 31, 1992.

Primary Examiner—Aristotelis Psitos
Assistant Examiner—W. Chris Kim
Attorney, Agent, or Firm—Wolfe, Greenfield & Sacks

[57] ABSTRACT

A drive circuit having two electronic switches formed from N-MOS transistors is designed to alternatively connect the input of a preamplifier stage to a first or second read sensor on the read head of a magnetic tape. The drive circuit also has a third electronic switch formed from an N-MOS transistor which grounds the input of the preamplifier stage. Based on logic input signals, a control circuit switches the first and second switches, or closes the third switch and simultaneously opens the first and second switches.

13 Claims, 2 Drawing Sheets

5,506,734

DRIVE CIRCUIT FOR A MAGNETIC CASSETTE READER WITH AUTO REVERSE AND MUTE FUNCTIONS

BACKGROUND OF THE INVENTION

1. Field of the Invention

The present invention relates to a drive circuit for a magnetic cassette reader.

2. Discussion of the Related Art

Modern magnetic cassette readers normally feature an autoreverse function for automatically reversing the tape so that both sides of the cassette can be read without turning the tape over relative to the read head.

To perform the autoreverse function, the read head has two read sensors, or four for stereo, which are connected alternatively, depending on the drive direction of the tape, to a preamplifier stage by an autoreverse drive circuit by which the read sensor is selected as a function of the logic value of a digital input signal. On known readers, the drive circuit typically uses bipolar devices, which have several drawbacks due to their physical and electric characteristics.

Bipolar transistors introduce considerable switching noise which is further amplified by the preamplifier stages; are difficult to control; present a poorly controllable switch edge; and, in the case of integrated circuits, have a substantial bulk.

Modern cassette readers also have a mute function whereby the output of the preamplifier stage, and consequently also of the final stage, is attenuated considerably, typically by about 80 dB, regardless of the drive direction of the tape.

The mute function is typically affected by bipolar transistor switch circuits or attenuators, but these circuits also have several drawbacks. More specifically, in addition to the problems posed by the presence of bipolar transistors on the autoreverse drive circuits, bipolar transistors in mute circuits also fail to provide a high degree of attenuation.

Difficulties are also encountered in forming the autoreverse and mute function drive circuits on the same integrated circuit, as well as in simultaneously controlling the switching of the reverse and mute circuits.

SUMMARY OF THE INVENTION

According to the present invention, there is provided a drive circuit for a magnetic tape reader having input terminals for receiving read signals and an output terminal. First and second switches, each having MOSFET's, operate to connect the output terminal to one of the input terminals.

A control circuit has input terminals for receiving a mute signal and a forward/reverse signal. In response to an activated mute signal, the control circuit deenergizes the first and second switches by energizing a third MOSFET switch. If the mute signal is not activated, the control circuit energizes either the first or second MOSFET to selectively couple the input signal from one of the sensors to the output terminal.

BRIEF DESCRIPTION OR THE DRAWINGS

A preferred non-limiting embodiment of the present invention will be described with reference to the accompanying drawings, in which.

DETAILED DESCRIPTION

Figure 1:
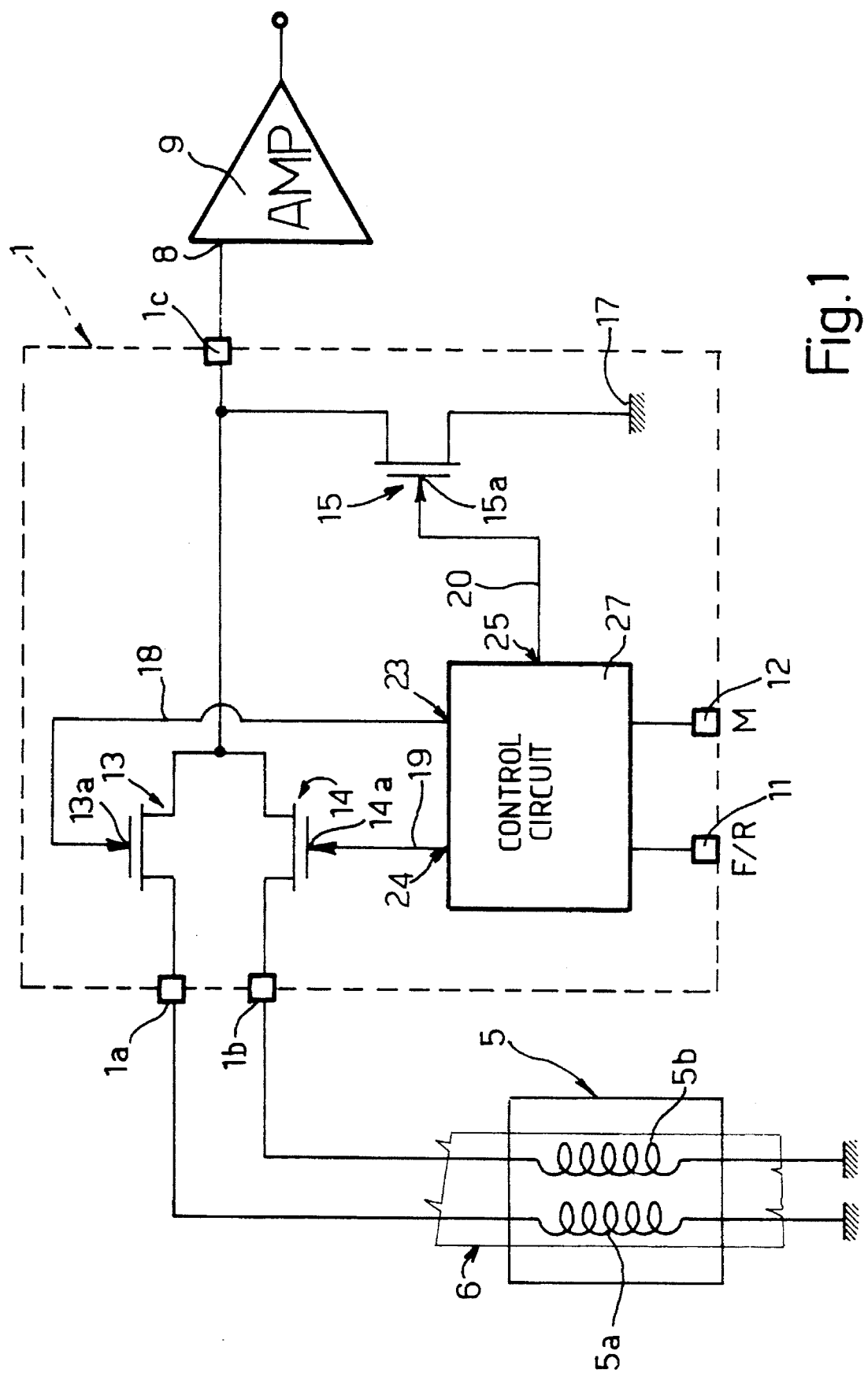
FIG. 1 is a schematic diagram of a circuit in accordance with the teachings of the present invention.

Circuit 1 in FIG. 1 is an autoreverse and mute function drive circuit for a MONO type read head 5. Read head 5 has two read sensors 5a, 5b (shown schematically as solenoids) for reading respective tracks (not shown) of a magnetic tape 6, and for simultaneously supplying respective read signals to input terminals 1a, 1b of circuit 1.

Circuit 1 also has an output terminal 1c which is connected to an input terminal 8 of a preamplifier stage 9, and which supplies input terminal 8 with one of the signals generated by read sensors 5a, 5b according to the value of a logic signal F/R supplied to input terminal 11 of circuit 1 (the autoreverse function). Circuit 1 also comprises a second input terminal 12 which receives a second logic signal M for muting both signals supplied by read head 5 (the mute function).

Circuit 1 comprises a first electronic switch 13 between sensor 5a and input terminal 8; a second electronic switch 14 between sensor 5b and input terminal 8; and a third electronic switch 15 between input terminal 8 of preamplifier stage 9 and a reference potential line 17 (ground).

According to the present invention, switches 13, 14, and 15 are MOS, preferably N-MOS, field effect transistors having respective gate terminals 13a, 14a, and 15a connected by respective lines 18, 19, and 20 to respective first, second, and third outputs 23, 24, and 25 of a control circuit 27 for switching switches 13, 14, and 15 according to logic signals F/R and M at terminals 11 and 12 of circuit 1.

More specifically, if a voltage corresponding to a logic "1" is provided at input terminal 11, circuit 27 supplies a positive voltage to gate terminal 13a and a near zero or negative voltage to gate terminal 14a, thus closing switch 13 and opening switch 14. Conversely, if a voltage corresponding to a logic "0" is provided at input terminal 11, circuit 27 supplies a positive voltage to gate terminal 14a and a zero or negative voltage to gate terminal 13a, thus closing switch 14 and opening switch 13. Thus, depending on the logic value at input 11, either sensor 5a or sensor 5b is connected to the input terminal 8 of preamplifier 9, for selecting the read track of tape 6.

These functions are effected as described provided that control terminal 12 has a voltage corresponding with a logic "0". Conversely, if input 12 has a voltage corresponding with a logic "1", a near zero voltage is supplied to gate terminals 13a and 14a, thus opening switches 13 and 14, and a positive voltage is supplied to gate terminal 15a to connect input 8 to line 17 via switch 15.

Attenuation of the signal produced by sensors 5a and 5b is thus virtually infinite, because input terminal 8 of preamplifier stage 9 is connected to the read head via two open switches. Actual attenuation, however, depends on the ratio of R3on/R1off>>100 dB, where R3on is the equivalent resistance of transistor 15 when on, and R1off the equivalent resistance of transistor 13 or 14 when off.

Figure 2:
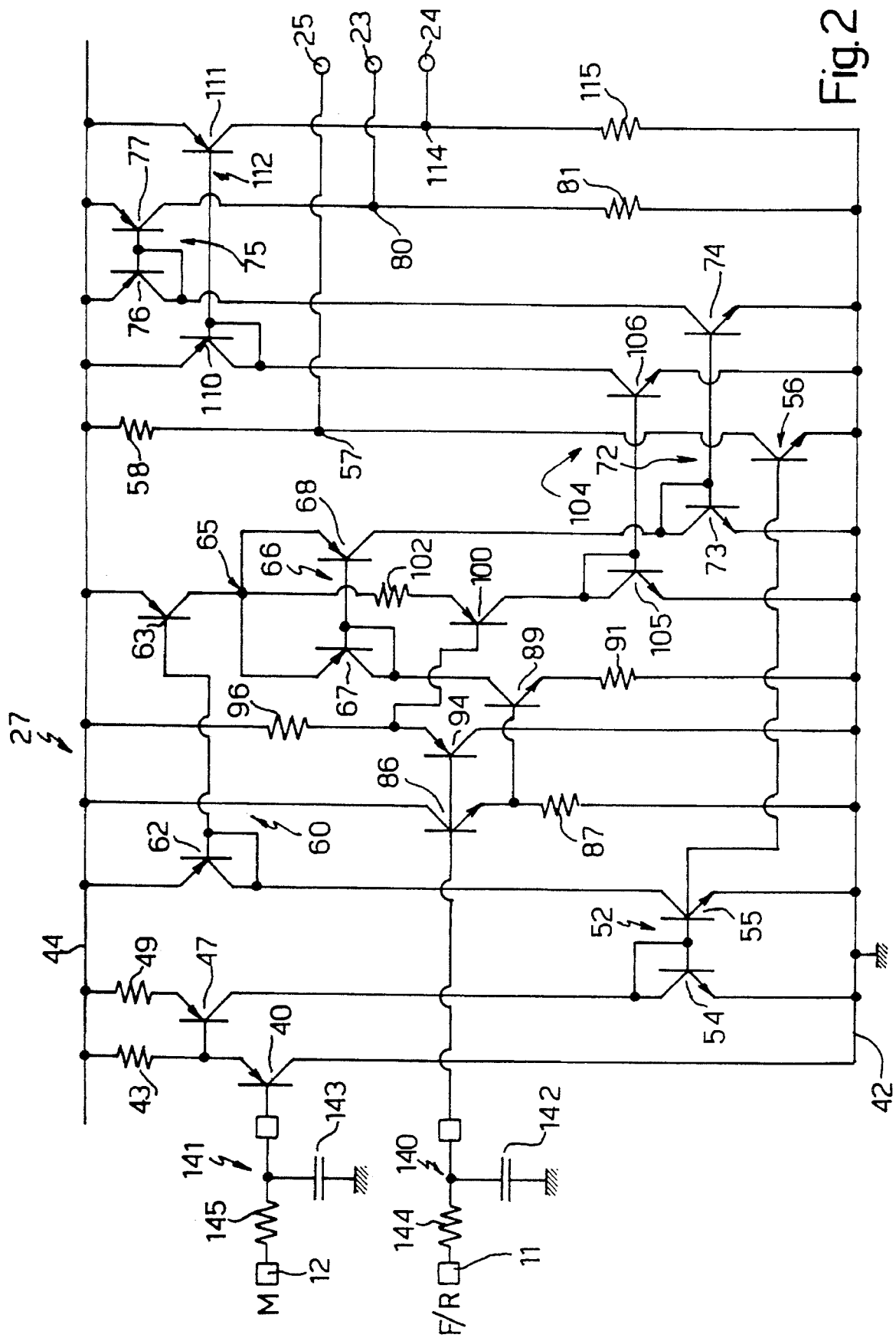
FIG. 2 is a schematic diagram of the control circuit.

Fig.2 shows a detailed example of circuit 27 for performing the above operations. Input terminal 12 of control circuit 27 is connected via RC circuit 141 to the base of a PNP type transistor 40, which has a collector connected to a line 42 at a first reference potential (ground), and an emitter connected through resistor 43 to a line 44 at a second reference potential (supply).

The emitter of transistor 40 is also connected to the base of a PNP transistor 47, which has an emitter connected to line 44 via resistor 49, and a collector connected to the input to a first current mirror circuit 52 formed by NPN transistors 54, 55, 56 having mutually-connected bases and emitters connected to line 42. More specifically, the input to current mirror circuit 52 consists of the collector of transistor 54 (diode-connected), while the outputs of circuit 52 are formed by the collectors of transistors 55 and 56. The collector of transistor 56 is connected to a first terminal 57 of a resistor 58, which presents a second terminal connected to line 44. Terminal 57 is also connected to the third output 25 of circuit 27 controlling switch 15.

The collector of transistor 55 is connected to the input of a second current mirror circuit 60 formed by PNP transistors 62, 63 having mutually-connected bases and emitters connected to line 44. More specifically, the input to second current mirror circuit 60 consists of the collector of transistor 62 (diode-connected), while the output is provided by the collector of transistor 63. The collector of transistor 63 is connected to a node 65 which, in turn, is connected to a third current mirror circuit 66 formed by PNP transistors 67, 68 (the first being diode-connected) having mutually-connected bases and emitters connected to node 65. The collector of transistor 68 is connected to a fourth current mirror circuit 72 formed by NPN transistors 73, 74 (the first being diode-connected) having mutually-connected bases and emitters connected to line 42. The input to fourth current mirror circuit 72 is provided by the collector of transistor 73, while the output is formed by the collector of transistor 74 which in turn is connected to a fifth current mirror circuit 75. More specifically, fifth current mirror circuit 75 comprises PNP transistors 76, 77 having mutually-connected bases, emitters connected to line 44, and collectors respectively forming the input and output of mirror 75.

The collector of transistor 77, and consequently the output of mirror 75, is connected to a first terminal 80 of a resistor 81 having a second terminal connected to line 42. Terminal 80 is connected to the first output 23 of circuit 27 controlling switch 13.

Input 11 is connected via a second RC circuit 140 to the base of an NPN transistor 86, which has a collector connected to line 44 and an emitter connected to line 42 through a resistor 87. The emitter of transistor 86 is also connected to the base of an NPN transistor 89, which has a collector connected to the collector of transistor 67 and an emitter connected to line 42 through a resistor 91. The base of transistor 86 is also connected to the base of a PNP transistor 94, which presents the collector connected to line 42 and the emitter connected to line 44 through a resistor 96. The emitter of transistor 94 is also connected to the base of a PNP transistor 100, which has an emitter connected to node 65 through a resistor 102. The collector of transistor 100 is connected to a sixth current mirror circuit 104 formed by NPN transistors 105, 106 having mutually-connected bases and emitters connected to line 42. More specifically, the input of sixth current mirror circuit 104 is formed by the collector of transistor 105 (diode-connected), while the output is formed by the collector of transistor 106. The output of sixth current mirror circuit 104 is connected to the collector of a PNP transistor 110 which, together with a PNP transistor 111, forms a seventh current mirror circuit 112. Transistors 110 and 111 have mutually-connected bases and emitters connected to line 44; and transistor 111 has a collector connected to a first terminal 114 of a resistor 115 having a second terminal connected to line 42. Terminal 114 of resistor 115 is also connected to the second output 24 of circuit 27 controlling switch 24.

Finally, each RC network 140, 141 comprises a capacitor 142, 143 located between the bases of transistors 86, 40 and ground line 42; and a resistor 144, 145 located between inputs 11, 12 and the bases of transistors 86, 40.

When input terminal 12 is supplied with a low voltage corresponding with a logic "0", transistors 40 and 47 are turned on and supply first current mirror circuit 52; transistor 56 is turned on and maintains node 57, and therefore third output 25, at a potential close to that of line 42 (ground); so that an input signal corresponding with logic "0" opens switch 15.

Moreover, transistor 55 turns on transistor 62 and transistor 63 so that node 65 is connected to the potential of line 44. As described below, this permits outputs 23 and 24 to be enabled by input 11, so that a logic "0" signal at input 12 enables the switch portion controlling switches 13 and 14.

Conversely, when input terminal 12 is supplied with a high voltage corresponding with a logic "1", transistors 40 and 47 are off; transistors 54, 55, and 56 are also off, so that output 25, via resistor 58, assumes a potential close to that of line 44 (supply); so that an input signal corresponding with logic "1" closes switch 15. Moreover, Transistors 62 and 63 are off so node 65 is no longer connected to supply line 44; thus transistors 67, 68, 73, 74, 76, 77, 100, 105, 106, 110, and 111 are off, and outputs 23 and 24 are maintained at the potential of ground line 42 via respective resistors 81 and 115. Consequently, a signal corresponding logic "1" at input 12 turns off switches 13 and 14.

When terminal 11 has a voltage corresponding with logic "1" (with a "0" at input 12), transistor 86 is biased directly and turned on, thus keeping transistor 89 on by virtue of the connection of node 65 to supply line 44. Consequently, transistors 67, 68, 73, 74, 76 and 77 are on, so that node 80 and output 23 are maintained at a potential close to that of supply line 44; switch 13 is closed; and (still with a logic "1" at input 11) transistors 94, 100, 105, 106, 110 and 111 are off, so that output 24 is maintained, via resistor 115, at the potential of line 42, and switch 14 is open.

Conversely, when terminal 11 is supplied with a voltage corresponding with logic "0" (with a "0" at terminal 12), transistors 86, 89, 67, 68, 73, 74, 76 and 77 are off; output 23 is maintained, via resistor 81, at the potential of line 42; and switch 13 is open. Similarly, transistors 94, 100, 105, 106, 110 and 111 are on, output 24 has a potential close to that of line 44; and switch 14 is closed.

When the F/R and M signals at input terminals 11 and 12 are switched, filters 140 and 141 generate signals for controlling the transistors of circuit 27 and for providing smooth leading and trailing edges, based on the RC characteristics of the filters, and for preventing undesired noise at the output produced by sharp switching of digital signals F/R and M.

The advantages of the circuit according to the present invention will be clear from the foregoing description.

In particular, the N-MOS field effect transistors have very little switching noise, since they have no intrinsic offset; have electrical characteristics (e.g. noise, resistivity) which may be controlled closely via appropriate sizing of the gate region; and, in the case of integrated circuits, require a smaller area than bipolar devices require.

Moreover, circuit 27 controls switching of the autoreverse and mute circuits in a straightforward, reliable manner, and ensures simultaneous switching of the two functions.

Finally, RC networks 140, 141 provide improved control of the switching edge of switches 13, 14, and 15, thus reducing switching noise.

To those skilled in the art, it will be clear that changes may be made to the circuit as described and illustrated herein without departing from the scope of the present invention.

For example, read head 5 may be a stereo type with two pairs of read sensors for respectively reading the "right" and "left" track on the magnetic tape. In this case, provision may be made for six MOS switches driven pairwise by outputs 23, 24, and 25 of a single control circuit 27 and output-connected to two preamplifiers.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A circuit for a magnetic cassette reader having first and second sensors, the circuit comprising:
    a first and second input terminal for receiving respective read signals from the first and second sensors;
    an output terminal;
    a first electronic switch including an MOS field effect transistor having a control terminal; and
    a second electronic switch including an MOS field effect transistor having a control terminal;
    the first and second switches for alternatively connecting the output terminal to one of the input terminals
    a third electronic switch coupled between the output terminal and a reference potential line, the third electronic switch including an MOS field effect transistor; and
    a control circuit for controlling the first, second, and third electronic switches, the control circuit comprising:
        a first control input terminal for receiving a first logic signal;
        means for switching the first and second switches in response to the first logic signal;
        a second control input terminal for receiving a second logic signal; and
        means for closing the third switch and for simultaneously opening the first and second switches in response to the second logic signal.

2. A circuit as claimed in claim 1 further comprising a first filter circuit connected to the first input terminal for filtering a digital control signal.

3. A circuit as claimed in claim 2 wherein the filter circuit is an RC circuit.

4. A circuit as claimed in claim 2 further comprising a second filter circuit connected to the second input terminal for filtering a digital control signal.

5. A circuit as claimed in claim 4 wherein the means for closing the third switch includes:
    a first current mirror for receiving a signal from the first input terminal, and a transistor for receiving a signal from the first current mirror and for providing an output signal to the third switch, and
    a second current mirror coupled to the first current mirror, the second current mirror being coupled to a switch for coupling the means for switching to a supply voltage; and
    the means for switching includes:
        a third plurality of current mirrors for receiving a signal from the second input terminal, for providing an energizing signal to the first switch in response to one logic level, and for providing an energizing signal to the second switch in response to another logic level.

6. A circuit as claimed in claim 1 further comprising a second filter circuit connected to the second input terminal for receiving a digital control signal and for providing a filtered signal.

7. A circuit as claimed in claim 6 wherein the filter circuit is an RC circuit.

8. A circuit as claimed in claim 1 wherein the means for closing the third switch includes:
    a first current mirror for receiving a signal from the first input terminal, and a transistor for receiving a signal from the first current mirror and for providing an output signal to the third switch, and
    a second current mirror coupled to the first current mirror, the second current mirror being coupled to a switch for coupling the means for switching to a supply voltage; and
    the means for switching includes:
        a third plurality of current mirrors for receiving a signal from the second input terminal, for providing an energizing signal to the first switch in response to one logic level, and for providing an energizing signal to the second switch in response to another logic level.

9. The circuit of claim 1, wherein the first electronic switch has a first lead coupled to the first sensor and a second lead coupled to the output terminal, and wherein the second switch has a first lead coupled to the second sensor and a second lead coupled to the output terminal.

10. The circuit of claim 1, wherein the reference voltage line is ground.

11. A drive circuit for coupling a reading device having first and second read sensors to an amplifier having an input terminal, the circuit comprising:
    a control circuit having at least one input terminal for receiving a forward/reverse signal and a mute signal, and at least one output terminal for providing control signals;
    a first MOS transistor having one electrode for coupling to the first read sensor, an electrode for coupling to the input terminal of the amplifier, and a gate electrode coupled to the first output terminal of the control circuit;
    a second MOS transistor having one electrode for coupling to the second read sensor, an electrode for coupling to the input terminal of the amplifier, and a gate electrode coupled to the second output terminal of the control circuit;
    wherein, in response to an activated mute signal, the control circuit energizes the third MOS transistor and deenergizes the first and second MOS transistors.

12. The circuit of claim 11 wherein, in response to a forward/reverse signal and in response to a non-activated mute signal, the control circuit selectively energizes one of the first and second MOS transistors.

13. A magnetic cassette reader comprising:
    a first sensor;
    a second sensor;
    an amplifier having an input lead;
    a drive circuit including:
        first and second input terminals coupled to the respective first and second sensors for receiving read signals;
        an output lead electrically coupled to the input lead of the amplifier;
        a first electronic switch including an MOS field effect transistor coupled in series between the first input terminal and the output lead;

a second electronic switch including an MOS field effect transistor coupled in series between the second input terminal and the output lead, the first and second switches for selectively connecting the output lead to one of the first and second input terminals;

a third electronic switch having a first lead coupled to the output lead, a second lead coupled to a reference voltage, and a control lead;

a control circuit having a first input lead for receiving a forward/reverse function signal and for selectively actuating one of the first and second electronic switches in response thereto, a second input lead for receiving a mute function signal; and wherein the control circuit selectively actuates the third electronic switch in response to the mute function signal and deactuates the first and second switches at the same time that the control circuit actuates the third electronic switch.

* * * * *